Oct. 22, 1968              J. G. RAMEY              3,406,888
WIRE ELECTRODE FEED MECHANISM FOR WELDING GUNS AND THE LIKE
Filed April 28, 1966
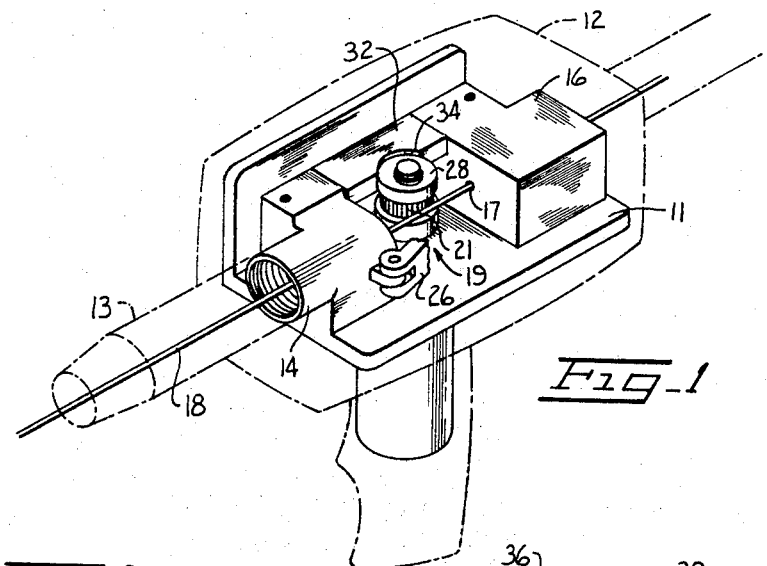
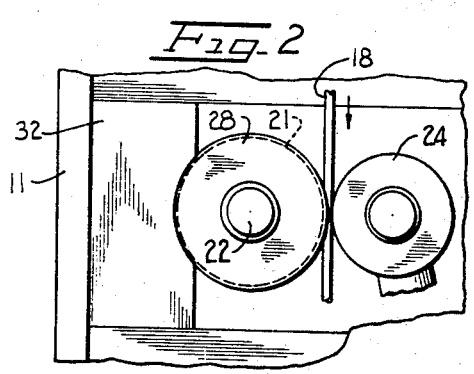
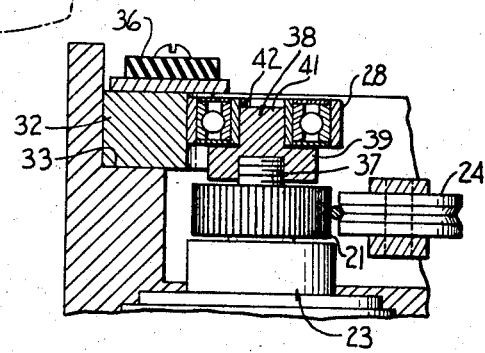
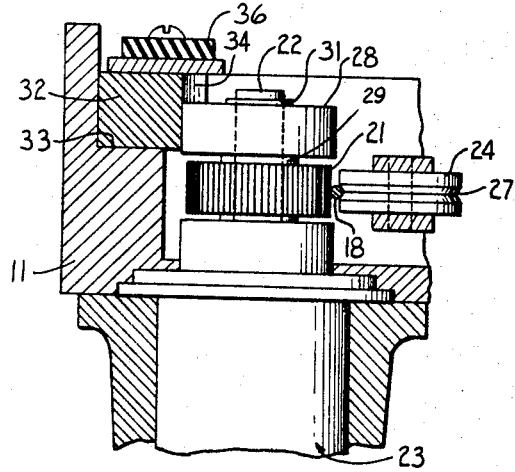
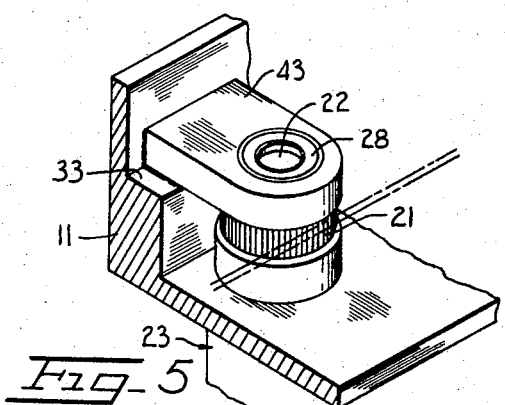
INVENTOR.
JAMES G. RAMEY
BY
Gardner & Zimmerman
ATTORNEYS 006 # United States Patent Office 3,406,888
Patented Oct. 22, 1968

3,406,888
WIRE ELECTRODE FEED MECHANISM FOR WELDING GUNS AND THE LIKE
James G. Ramey, 1709 Myrtle St.,
Oakland, Calif. 94607
Filed Apr. 28, 1966, Ser. No. 545,955
6 Claims. (Cl. 226—187)

ABSTRACT OF THE DISCLOSURE

A hand operated welding gun of the type which includes a feed mechanism for selectively feeding a wire electrode into an electric arc. The gun is provided with mechanism for preventing transverse pressure on the drive roll for the wire electrode from deleteriously affecting the drive roll motor bearings. The end of the motor shaft which carries the drive roll has a journal bearing concentrically secured to it. This journal bearing engages within an open arcuate notch in a thrust block which is secured to the frame of the welding gun. The thrust block and journal bearing cooperate to oppose the transverse force exerted on the drive roll by either the wire electrode being fed or a spring urged pinch roller. This countering of the transverse force minimizes shaft deflection to in turn relieve force unbalance on the motor bearing.

---

This invention relates to hand operated welding guns or equivalent devices for consumable electrode welding, and is more particularly directed to an improved wire electrode feed mechanism for such devices.

Hand operated welding guns for consumable electrode welding typically include a feed mechanism for selectively feeding a wire electrode into an electric arc. The feed mechanism comprises a knurled drive roll secured to the end of the shaft of a wire feed motor which is mounted within the gun housing. The wire is guided over the periphery of the drive roll, and a driven roll with a V-groove to accommodate the wire is provided to hold the wire against the drive roll periphery. In this regard, the driven roll is pivotally mounted upon the gun housing and spring loaded to urge the wire against the drive roll. It will be appreciated that since the end of the motor shaft that carries the drive roll is unsupported, the force exerted on the drive roll tends to deflect the shaft. Shaft deflection causes unbalanced forces to be exerted on the motor bearings with the result that bearing life is materially shortened. In actual practice frequent replacement of the feed motor is required due to bearing failure.

It is therefore an object of the present invention to provide an improved wire feed mechanism for hand operated welding guns, which mechanism functions to relieve unbalanced forces exerted on the feed motor bearings and thereby provide materially increased bearing life.

Another object of the invention is the provision of a shaft support arrangement for opposing the force exerted on the drive roll of a wire feed mechanism to thereby minimize deflection of the feed motor shaft.

Still another object of the invention is to provide a shaft support arrangement of the class described which may be readily adapted to incorporation in existing welding guns to provide an improved wire feed mechanism.

It is a further object of the invention to provide an arrangement of the class described which is of simple low cost design.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of an improved wire feed mechanism in accordance with the present invention as incorporated in a welding gun.

FIGURE 2 is a plan view of the mechanism.

FIGURE 3 is a transverse sectional view through the gun, illustrating the improved feed mechanism.

FIGURE 4 is a view similar to FIGURE 3, but illustrating a modified form of the mechanism.

FIGURE 5 is a perspective view of another modified form of the mechanism.

Referring now to FIGURE 1, there is shown a welding gun which includes a wire feed mechanism mounting bracket 11 enclosed within a gun housing 12. The housing includes a barrel portion 13 which projects from a bushing 14 included with the bracket 11. Spaced from the bushing there is provided a guide block 16 provided with an aperture 17. A wire electrode 18 extends through the aperture into the bushing, and then through the barrel portion 13 in a conventional manner. In order to feed the wire through the barrel portion, a wire feed mechanism 19 is provided on the bracket 11. The feed mechanism includes a knurled drive roll 21 secured to the end of a shaft 22 of a feed motor 23 mounted within the housing subjacent the bracket 11. The wire 18 extends over the periphery of the drive roll and is maintained in close engagement therewith by a driven roll 24. More particularly, the driven roll is journalled at the end of an arm 26 pivotally secured to the periphery of the bushing 14. The arm is spring loaded to urge the driven roll toward the drive roll 21, and the driven roll is provided with a V-groove 27 to accommodate the wire 18. It will be thus appreciated that the wire is clamped between the drive roll 21 and driven roll 24 such that when the former is rotated by the motor 23, the wire is fed forwardly through the barrel portion 13.

To the extent described to this point, the feed mechanism is conventional. However, with a conventional feed mechanism there is nothing provided to counter the force exerted on the drive roll by the spring loading of the driven roll. The shaft 22 would thus normally tend to be deflected by the force, and in turn exert unbalanced forces on the motor bearings with an attendant substantial shortening of bearing life. However, this problem is overcome by the improved feed mechanism of the present invention. In accordance with the basic aspects of the invention a shaft support arrangement is provided in association with the free end of the motor shaft 22 to oppose the force exerted on the drive roll 21 by the driven roll 24. Such countering of the driven roll force greatly minimize shaft deflection to in turn relieve force unbalance on the motor bearings. The shaft support arrangement may be variously provided, and in this regard one embodiment thereof is illustrated in FIGURES 1-3. As shown therein, the motor shaft 22 is modified to be elongated beyond the length thereof employed in a conventional feed mechanism. In addition, rather than being threaded in the conventional manner to receive a drive roll retaining nut, the shaft is provided with a peripheral groove adjacent its end. A journal bearing 28, preferably a ball bearing, is concentrically disposed about the free end of the shaft, and a washer 29 is preferably interposed between the bearing and drive roll. A snap ring 31 engaging the peripheral groove at the free end of the shaft then serves to retain the bearing in place. The bearing is engageable with a thrust block 32 secured to the bracket 11 at a position on the opposite side of the shaft from the driven roll 24. In this regard the bracket is provided with a shoulder 33 extending longitudinally between the bushing 14 and guide block 16. The block 32 is rectangular and supported upon the shoulder in bridging relation to the bushing and guide block on the opposite side of the shaft from the driven roll. The block is provided with an arcuate notch 34 for receiving the bearing 28 in close fitting relation. It will be thus appreciated, particularly from FIGURE 3, that the force exerted on the drive roll 21 by the driven roll 24 tends to urge the bearing into more intimate engagement with the notch of the thrust block 32. The thrust block thus exerts an equal and opposite force on the bearing to that exerted on the drive roll by the driven roll. The forces on the motor shaft are thus balanced and shaft deflection is prevented.

The thrust block 32 is preferably of electrical insulating material so as to provide insulation between the drive roll 21, as contacted by the wire 18, and portions of the bracket 11. A terminal strip 36 secured in bridging relation to the bushing 14 and guide block 16 in overlying relation to the thrust block is hence insulated by same.

Considering now a modified form of the shaft support arrangement, FIGURE 4 depicts the motor 23 as having a shaft 22 of conventional length and conventionally threaded at its free end, as indicated at 37, to normally receive a drive roll retaining nut (not shown). In this case the existing motor shaft is converted for use with a shaft support arrangement in accordance with the present invention by means of an adapter 38 in the form of a nut 39 having a stub shaft 41 projecting coaxially therefrom. The nut is secured to the threaded end 37 of the shaft and the stub shaft 41 is received by the central bore 42 of the bearing 28. The thrust block 32 is mounted as described hereinbefore, and in the present case the terminal strip 36 engages the upper end face of the bearing to serve as a retainer therefor.

A further modified form of the invention is illustrated in FIGURE 5 wherein the bearing 28 is rigidly secured to the bracket 11. More particularly, an ear 43 is secured to the shoulder 33 to project transversely therefrom. The bearing 28 is mounted in the free end of the ear and receives the motor shaft 22 to thereby support same in undeflected position.

What is claimed is:

1. In a welding gun wire feed mechanism of the type including a mounting bracket, a wire feed motor mounted subjacent said bracket and having a rotary drive shaft projecting upwardly therefrom, a drive roll secured to the upwardly projecting end of said shaft, and a driven roll journalled at the free end of a pivoted arm spring loaded to urge the driven roll into engagement with the drive roll to clamp a wire electrode therebetween, the improvement comprising a shaft support arrangement having a portion secured to said bracket and a portion secured to the free end of said shaft at positions to oppose forces directed on said drive roll by said driven roll, said shaft support arrangement comprising a journal bearing concentrically secured to the free end of said shaft, and thrust block means secured to said bracket for engagement with said bearing on the opposite side of said shaft from said driven roll.

2. The combination of claim 1, further defined by said thrust block means comprising a rectangular block of insulating material secured to said bracket on the opposite side of said shaft from said driven roll and having an arcuate notch in close engagement with said bearing.

3. The combination of claim 1, further defined by said free end of said shaft having a peripheral groove, a washer on said shaft interposed between said drive roll and said bearing, and a snap ring engaging said groove to retain said bearing on said shaft.

4. The combination of claim 1 further defined by the free end of said shaft being threaded, an adapter including a nut and a stub shaft projecting coaxially from said nut, said nut threadably secured to the free end of said motor shaft, said bearing concentrically disposed on said stub shaft, and a terminal strip secured to said bracket engaging the upper face of said bearing to retain same on said stub shaft.

5. The combination of claim 3, further defined by said thrust block means comprising a rectangular block of insulating material secured to said bracket on the opposite side of said shaft from said driven roll and having an arcuate notch in close engagement with said bearing.

6. The combination of claim 4, further defined by said thrust block means comprising a rectangular block of insulating material secured to said bracket on the opposite side of said shaft from said driven roll and having an arcuate notch in close engagement with said bearing.

References Cited

UNITED STATES PATENTS 3,237,831  3/1966  Johnson _____ 226—178
3,285,486  11/1966  Tamura et al. _____ 226—180

OTHER REFERENCES

Rowan: "Apparatus for Salvaging Self-Supporting Cable," Western Electric Technical Digest, No. 5, Jan. 1967, p. 9.

M. HENSON WOOD, JR., *Primary Examiner.*

J. P. MULLINS, *Assistant Examiner.*